US012627359B2

(12) United States Patent
Agiwal

(10) Patent No.: US 12,627,359 B2
(45) Date of Patent: May 12, 2026

(54) METHOD AND APPARATUS FOR RADIO LINK MONITORING AND BEAM FAILURE DETECTION MEASUREMENTS IN WIRELESS COMMUNICATION SYSTEM

(71) Applicant: Samsung Electronics Co., Ltd., Suwon-si (KR)

(72) Inventor: Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 308 days.

(21) Appl. No.: 18/279,821

(22) PCT Filed: Feb. 28, 2022

(86) PCT No.: PCT/KR2022/002874
§ 371 (c)(1),
(2) Date: Aug. 31, 2023

(87) PCT Pub. No.: WO2022/186575
PCT Pub. Date: Sep. 9, 2022

(65) Prior Publication Data
US 2024/0056850 A1 Feb. 15, 2024

(30) Foreign Application Priority Data
Mar. 2, 2021 (KR) ........................ 10-2021-0027311

(51) Int. Cl.
*H04W 24/02* (2009.01)
*H04B 7/06* (2006.01)
*H04W 24/08* (2009.01)
*H04W 76/28* (2018.01)

(52) U.S. Cl.
CPC ........ *H04B 7/06964* (2023.05); *H04W 24/02* (2013.01); *H04W 24/08* (2013.01); *H04W 76/28* (2018.02)

(58) Field of Classification Search
CPC ..... H04W 24/02; H04W 24/08; H04W 76/28; H04B 7/06964
See application file for complete search history.

(56) References Cited

U.S. PATENT DOCUMENTS

| | | |
|---|---|---|
| 2020/0314868 A1 | 10/2020 | Tseng et al. |
| 2020/0359246 A1 | 11/2020 | Zhang et al. |
| 2023/0239712 A1* | 7/2023 | Kuang .............. H04W 52/0216 |
| 2024/0073728 A1* | 2/2024 | Niu ........................ H04W 24/10 |
| 2024/0073729 A1* | 2/2024 | Hu ......................... H04W 24/10 |

OTHER PUBLICATIONS

Ericsson, 'Discussions on UE power saving for RLM and BM', R4-2102241, 3GPP TSG-RAN WG4 Meeting #98-e, Electronic Meeting, Jan. 15, 2021.

(Continued)

*Primary Examiner* — Kent Krueger
(74) *Attorney, Agent, or Firm* — Jefferson IP Law, LLP

(57) ABSTRACT

The present disclosure relates to a 5G communication system or a 6G communication system for supporting higher data rates beyond a 4G communication system such as long term evolution (LTE). The present disclosure provides method and apparatus for RLM and BFD measurements in next generation wireless communication system.

15 Claims, 6 Drawing Sheets

(56) References Cited

OTHER PUBLICATIONS

Apple, 'UE measurement relaxation for RLM and/or BFD', R4-2100219, 3GPP TSG-RAN WG4 Meeting #98-e, Electronic Meeting, Jan. 15, 2021.

Cmcc, 'Discussion on RLM/BFD relaxation for NR power saving enhancement', R4-2100821, 3GPP TSG-RAN WG4 Meeting # 98-e, Electronic Meeting, Jan. 15, 2021.

ZTE Corporation, 'On RLM and RLF relaxation for UE power saving', R4-2100043, 3GPP TSGRAN WG4 Meeting # 98-e, Electronic Meeting, Jan. 15, 2021.

3GPP TS 38.133 V17.0.0 (Dec. 2020) 3rd Generation Partnership Project; Technical Specification Group Radio Access Network; NR; Requirements for support of radio resource management (Release 17), Jan. 12, 2021.

3GPP TS 38.133 V17.10.0 (Jun. 2023) 3rd Generation Partnership Project; Technical Specification Group Radio Access Network; NR; Requirements for support of radio resource management (Release 17), Jun. 30, 2023.

3GPP TS 38.331 V17.0.0 (Mar. 2022) 3rd Generation Partnership Project; Technical Specification Group Radio Access Network; NR; Radio Resource Control (RRC) protocol specification (Release 17), Apr. 19, 2022.

3GPP TS 38.331 V17.5.0 (Jun. 2023) 3rd Generation Partnership Project; Technical Specification Group Radio Access Network; NR; Radio Resource Control (RRC) protocol specification (Release 17), Jul. 1, 2023.

3GPP TS 38.306 V17.5.0 (Jun. 2023) 3rd Generation Partnership Project; Technical Specification Group Radio Access Network; NR; User Equipment (UE) radio access capabilities (Release 17), Jul. 1, 2023.

VIVO, Discussion on R17 RLM/BFD relaxation, R4-2101462, 3GPP TSG-RAN WG4 Meeting #98-e, Jan. 15, 2021, XP051972563.

Spreadtrum Communications, Discussions on the IS and 00S counting procedure, R2-1804477, 3GPP TSG-RAN WG2 Meeting #101bis, Apr. 5, 2018, XP051414777.

Extended European Search Report dated Jan. 14, 2025, issued in European Patent Application No. 22763558.8.

* cited by examiner

FIG. 2

|  | T1 | X (Out of sync) | X (In sync) |
|---|---|---|---|
| No DRX or T310 running | $T_{RLM-RS}$ | 10 | 5 |
| Short DRX ( < 320ms) | Max ($T_{DRX}$, $T_{RLM-RS}$) | 15 | 7.5 |
| Long DRX (> 320ms) | $T_{DRX}$ | 10 | 5 |

FIG. 4

|  | T1 | X |
|---|---|---|
| No DRX | $T_{BFD-RS}$ | 5 |
| Short DRX ( < 320ms) | Max $(T_{DRX}, T_{BFD-RS})$ | 7.5 |
| Long DRX (> 320ms) | $T_{DRX}$ | 5 |

METHOD AND APPARATUS FOR RADIO LINK MONITORING AND BEAM FAILURE DETECTION MEASUREMENTS IN WIRELESS COMMUNICATION SYSTEM

TECHNICAL FIELD

The disclosure relates to a wireless communication system. Specifically, the disclosure relates to an apparatus, a method and a system for RLM (radio link monitoring) and BFD (beam failure detection) measurements in wireless communication system.

BACKGROUND ART

Considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

Meanwhile, there have been various studies on RLM and BFD measurements for enhanced wireless communication system recently.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

There are needs to enhance current RLM and BFD procedures for next generation wireless communication system.

Solution to Problem

Aspects of the disclosure are to address at least the above-mentioned problems and/or disadvantages and to provide at least the advantages described below. Accordingly, an aspect of the disclosure is to provide a communication method and system for converging a sixth generation (6G) and a fifth generation (5G) communication system for supporting higher data rates beyond a fourth generation (4G).

In accordance with an aspect of the disclosure, a method performed by a terminal is provided. The method comprises: receiving, from a base station, at least one of a relaxed radio link monitoring (RLM) configuration or a relaxed beam failure detection (BFD) configuration; in case that a length of a discontinuous reception (DRX) cycle configured for the terminal is shorter than a threshold, identifying whether a condition to apply at least one of the relaxed RLM configuration or the relaxed BFD configuration is met; in case that the condition is met, performing at least one of an RLM measurement based on the relaxed RLM configuration or a BFD measurement based on the relaxed BFD configuration; and in case that the condition is not met, performing at least one of the RLM measurement based on a normal RLM configuration or the BFD measurement based on a normal BFD configuration, wherein a relaxed indication interval according to the relaxed RLM configuration is an integer multiple of a normal indication interval according to the normal RLM configuration, and a relaxed evaluation interval according to the relaxed RLM configuration is an integer multiple of a normal evaluation interval according to the normal RLM configuration, and wherein a relaxed indication interval according to the relaxed BFD configuration is an integer multiple of a normal indication interval according to the normal BFD configuration, and a relaxed evaluation interval according to the relaxed BFD configuration is an integer multiple of a normal evaluation interval according to the normal BFD configuration.

In accordance with an aspect of the disclosure, a method performed by a base station is provided. The method comprises: transmitting, to the terminal, at least one of a relaxed radio link monitoring (RLM) configuration or a relaxed beam failure detection (BFD) configuration, wherein, in case that a length of a discontinuous reception (DRX) cycle configured for the terminal is shorter than a threshold and a condition for at least one of the relaxed RLM configuration or the relaxed BFD configuration is met, at least one of an RLM measurement based on the relaxed RLM configuration or a BFD measurement based on the relaxed BFD configuration is performed, wherein, in case that the length of the DRX cycle configured for the terminal is shorter than the threshold and the condition is not met, at least one of the RLM measurement based on a normal RLM configuration or the BFD measurement based on a normal BFD configuration is performed, wherein a relaxed indication interval according to the relaxed RLM configuration is an integer multiple of a normal indication interval according to the normal RLM configuration, and a relaxed evaluation interval according to the relaxed RLM configuration is an integer multiple of a normal evaluation interval according to the normal RLM configuration, and wherein a relaxed indication interval according to the relaxed BFD configuration is an integer multiple of a normal indication interval according to the normal BFD configuration, and a relaxed evaluation interval according to the relaxed BFD configuration is an integer multiple of a normal evaluation interval according to the normal BFD configuration.

In accordance with another aspect of the disclosure, a terminal is provided. The terminal comprises a transceiver; and a controller configured to: receive, from a base station, at least one of a relaxed radio link monitoring (RLM) configuration or a relaxed beam failure detection (BFD) configuration, in case that a length of a discontinuous reception (DRX) cycle configured for the terminal is shorter than a threshold, identify whether a condition to apply at least one of the relaxed RLM configuration or the relaxed BFD configuration is met, in case that the condition is met, perform at least one of an RLM measurement based on the relaxed RLM configuration or a BFD measurement based on the relaxed BFD configuration, and in case that the condition is not met, perform at least one of the RLM measurement based on a normal RLM configuration or the BFD measurement based on a normal BFD configuration, wherein a relaxed indication interval according to the relaxed RLM configuration is an integer multiple of a normal indication interval according to the normal RLM configuration, and a relaxed evaluation interval according to the relaxed RLM configuration is an integer multiple of a normal evaluation interval according to the normal RLM configuration, and wherein a relaxed indication interval according to the relaxed BFD configuration is an integer multiple of a normal indication interval according to the normal BFD configuration, and a relaxed evaluation interval according to the relaxed BFD configuration is an integer multiple of a normal evaluation interval according to the normal BFD configuration.

In accordance with another aspect of the disclosure, a base station is provided. The base station comprises a transceiver; and a controller configured to: transmit, to the terminal, at least one of a relaxed radio link monitoring (RLM) configuration or a relaxed beam failure detection (BFD) configuration, wherein, in case that a length of a discontinuous reception (DRX) cycle configured for the terminal is shorter than a threshold and a condition for at least one of the relaxed RLM configuration or the relaxed BFD configuration is met, at least one of an RLM measurement based on the relaxed RLM configuration or a BFD measurement based on the relaxed BFD configuration is performed, wherein, in case that the length of the DRX cycle configured for the terminal is shorter than the threshold and the condition is not met, at least one of the RLM measurement based on a normal RLM configuration or the BFD measurement based on a normal BFD configuration is performed, wherein a relaxed indication interval according to the relaxed RLM configuration is an integer multiple of a normal indication interval according to the normal RLM configuration, and a relaxed evaluation interval according to the relaxed RLM configuration is an integer multiple of a normal evaluation interval according to the normal RLM configuration, and wherein a relaxed indication interval according to the relaxed BFD configuration is an integer multiple of a normal indication interval according to the normal BFD configuration, and a relaxed evaluation interval according to the relaxed BFD configuration is an integer multiple of a normal evaluation interval according to the normal BFD configuration.

Advantageous Effects of Invention

According to various embodiments of the disclosure, RLM and BFD procedures can be efficiently enhanced.

BRIEF DESCRIPTION OF DRAWINGS

The above and other aspects, features, and advantages of certain embodiments of the disclosure will be more apparent from the following description taken in conjunction with the accompanying drawings, in which:

FIG. 2 illustrates an example of evaluation period and indication intervals in accordance with an embodiment of the disclosure.

FIG. 4 illustrates another example of evaluation period and indication intervals in accordance with an embodiment of the disclosure.

MODE FOR THE INVENTION

Figure 1:
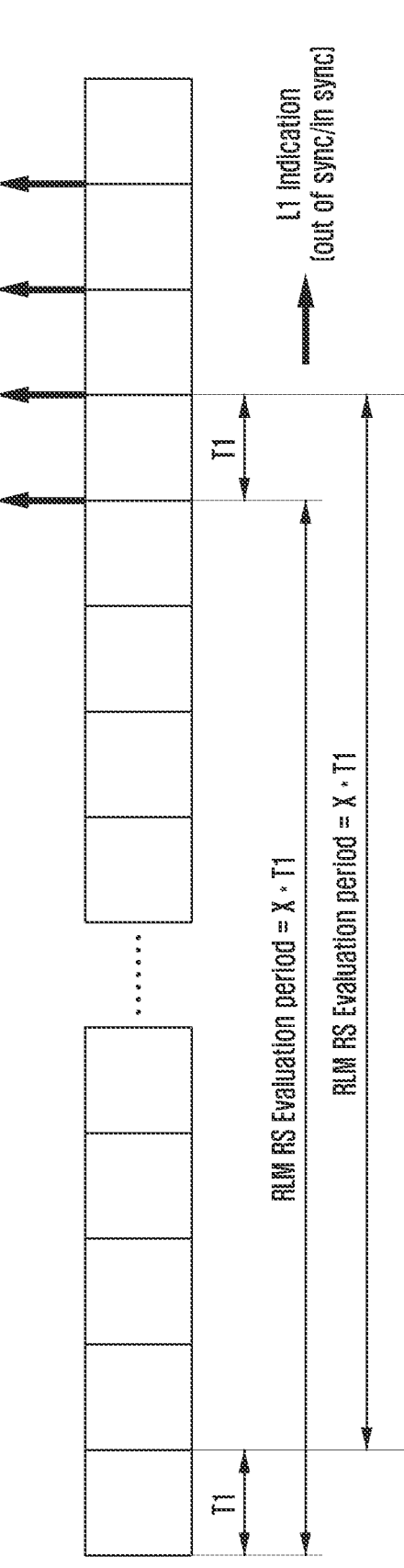
FIG. 1 illustrates an example of evaluation period in accordance with an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station" is an entity communicating with a user equipment (UE) and may be referred to as BS, base transceiver station (BTS), node B (NB), evolved NB (eNB), access point (AP), 5G NB (5GNB), or next generation node B (gNB), etc.

The "user equipment" is an entity communicating with a BS and/or another user equipment and may be referred to as UE, device, mobile station (MS), mobile equipment (ME), or terminal.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So fifth generation wireless communication system (also referred as next generation radio or NR) is being developed to meet the growing demand for high speed data services, support ultra-reliability and low latency applications.

The fifth generation wireless communication system supports not only lower frequency bands but also in higher frequency (e.g., mmWave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the UE cater service to the end customer. Few example use cases the fifth generation wireless communication system wireless system is expected to address is enhanced Mobile Broadband (eMBB), massive Machine Type Communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the fifth generation wireless communication system operating in higher frequency (e.g., mmWave) bands, UE and gNB communicates with each other using Beamforming. Beamforming techniques are used to mitigate the propagation path losses and to increase the propagation distance for communication at higher frequency band. Beamforming enhances the transmission and reception performance using a high-gain antenna. Beamforming can be classified into Transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas.

In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal.

By using beamforming technique, a transmitter can make plurality of transmit beam patterns of different directions. Each of these transmit beam patterns can be also referred as TX beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming. A receiver can also make plurality of RX beam patterns of different directions. Each of these receive patterns can be also referred as RX beam.

CA (carrier aggregation)/Multi-connectivity in fifth generation wireless communication system: The fifth generation wireless communication system, supports standalone mode of operation as well dual connectivity (DC). In DC a multiple Rx/Tx UE may be configured to utilize resources provided by two different nodes (or NBs) connected via non-ideal backhaul. One node acts as the Master Node (MN) and the other as the Secondary Node (SN). The MN and SN are connected via a network interface and at least the MN is connected to the core network. NR also supports MultiRAT Dual Connectivity (MR-DC) operation whereby a UE in radio resource control connected (RRC_CONNECTED) is configured to utilize radio resources provided by two distinct schedulers, located in two different nodes connected via a non-ideal backhaul and providing either E-UTRA (Evolved Universal Mobile Telecommunications System (UMTS) Terrestrial Radio Access) (i.e. if the node is an ng-eNB) or NR access (i.e. if the node is a gNB). In NR for a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) and all secondary cells. In NR the term Master Cell Group (MCG) refers to a group of serving cells associated with the Master Node, comprising of the Primary Cell (PCell) and optionally one or more Secondary Cells (SCells). In NR the term Secondary Cell Group (SCG) refers to a group of serving cells associated with the Secondary Node, comprising of the Primary SCG cell (PSCell) and optionally one or more SCells. In NR PCell refers to a serving cell in MCG, operating on the primary frequency, in which the UE either performs the initial connection establishment procedure or initiates the connection reestablishment procedure. In NR for a UE configured with CA, Scell is a cell providing additional radio resources on top of Special Cell. PSCell refers to a serving cell in SCG in which the UE performs random access when performing the Reconfiguration with Sync procedure. For Dual Connectivity operation the term SpCell (i.e. Special Cell) refers to the PCell of the MCG or the PSCell of the SCG, otherwise the term Special Cell refers to the PCell.

System information acquisition in fifth generation wireless communication system: In the fifth generation wireless communication system, node B (gNB) or base station in cell broadcast Synchronization Signal and PBCH block (SSB) consists of primary and secondary synchronization signals (PSS, SSS) and system information. System information includes common parameters needed to communicate in cell. In the fifth generation wireless communication system (also referred as next generation radio or NR), System Information (SI) is divided into the MIB and a number of SIBs where:

the MIB is always transmitted on the BCH with a periodicity of 80 ms and repetitions made within 80 ms and it includes parameters that are needed to acquire SIB1 from the cell.

the SIB1 is transmitted on the DL-SCH with a periodicity of 160 ms and variable transmission repetition. The default transmission repetition periodicity of SIB1 is 20 ms but the actual transmission repetition periodicity is up to network implementation. The scheduling information in SIB 1 includes mapping between SIBs and SI messages, periodicity of each SI message and SI window length. The scheduling information in SIB 1 includes an indicator for each SI message, which indicates whether the concerned SI message is being broadcasted or not. If at least one SI message is not being broadcasted, SIB1 may include random access resources (PRACH preamble(s) and PRACH resource (s)) for requesting gNB to broadcast one or more SI message(s).

SIBs other than SIB1 are carried in SystemInformation (SI) messages, which are transmitted on the DL-SCH.

PDCCH in fifth generation wireless communication system: In the fifth generation wireless communication system, Physical Downlink Control Channel (PDCCH) is used to schedule downlink (DL) transmissions on Physical Downlink Shared Channel (PDSCH) and uplink (UL) transmissions on Physical Uplink Shared Channel (PUSCH), where the Downlink Control Information (DCI) on PDCCH includes: Downlink assignments containing at least modulation and coding format, resource allocation, and hybrid automatic repeat request (HARQ) information related to downlink shared channel (DL-SCH); Uplink scheduling grants containing at least modulation and coding format, resource allocation, and HARQ information related to uplink shared channel (UL-SCH). In addition to scheduling, PDCCH can be used to for: Activation and deactivation of configured PUSCH transmission with configured grant; Activation and deactivation of PDSCH semi-persistent transmission; Notifying one or more UEs of the slot format; Notifying one or more UEs of the physical resource block(s) (PRB(s)) and orthogonal frequency division multiplexing (OFDM) symbol(s) where the UE may assume no transmission is intended for the UE; Transmission of transmission power control (TPC) commands for Physical Uplink Control Channel (PUCCH) and PUSCH; Transmission of one or more TPC commands for sounding reference signal (SRS) transmissions by one or more UEs; Switching a UE's active bandwidth part; Initiating a random access procedure.

A UE monitors a set of PDCCH candidates in the configured monitoring occasions in one or more configured COntrol REsource SETs (CORESETs) according to the corresponding search space configurations. A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own demodulation reference signal (DMRS). Quadrature phase shift keying (QPSK) modulation is used for PDCCH.

In fifth generation wireless communication system, a list of search space configurations are signaled by gNB for each configured bandwidth part (BWP) wherein each search configuration is uniquely identified by an identifier. Identifier of search space configuration to be used for specific purpose such as paging reception, SI reception, random access response (RAR) reception is explicitly signaled by gNB. In NR search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion (s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the equation 1 below:

$$(y*(\text{number of slots in a radio frame})+x-\text{Monitoring-offset-PDCCH-slot})\bmod (\text{Monitoring-periodicity-PDCCH-slot})=0;$$ [Equation 1]

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. search space configuration includes the identifier of CORESET configuration associated with it. A list of CORESET configurations are signaled by gNB for each configured BWP wherein each CORESET configuration is uniquely identified by an identifier. Note that each radio frame is of 10 ms duration. Radio frame is identified by a radio frame number or system frame number. Each radio frame comprises of several slots wherein the number of slots in a radio frame and duration of slots depends on sub carrier spacing. The number of slots in a radio frame and duration of slots depends radio frame for each supported subcarrier spacing (SCS) is predefined in NR. Each CORESET configuration is associated with a list of TCI (Transmission configuration indicator) states. One DL reference signal (RS) identifier (ID) (synchronization signal block (SSB) or channel state information reference signal (CSI-RS)) is configured per TCI state. The list of TCI states corresponding to a CORESET configuration is signaled by gNB via RRC signaling. One of the TCI state in TCI state list is activated and indicated to UE by gNB. TCI state indicates the DL TX beam (DL TX beam is quasi-collocated (QCLed) with SSB/CSI RS of TCI state) used by GNB for transmission of PDCCH in the PDCCH monitoring occasions of a search space.

BWP operation in fifth generation wireless communication system: In fifth generation wireless communication system bandwidth adaptation (BA) is supported. With BA, the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP). BA is achieved by configuring RRC connected UE with BWP(s) and telling the UE which of the configured BWPs is currently the active one. When BA is configured, the UE only has to monitor PDCCH on the one active BWP i.e. it does not have to monitor PDCCH on the entire DL frequency of the serving cell. In RRC connected state, UE is configured with one or more DL and UL BWPs, for each configured Serving Cell (i.e. PCell or SCell). For an activated Serving Cell, there is always one active UL and DL BWP at any point in time.

In the 5th generation (also referred as NR or New Radio) wireless communication system UE can be in one of the following RRC state: RRC IDLE, RRC INACTIVE and RRC_CONNECTED. The RRC states can further be characterized as follows:

In RRC IDLE state, a UE specific discontinuous reception (DRX) may be configured by upper layers (i.e. non-access stratum (NAS)). The UE, monitors Short Messages transmitted with P-RNTI over DCI; Monitors a Paging channel for CN paging using 5G-S-TMSI;—Performs neighbouring cell measurements and cell (re-)selection; Acquires system information and can send SI request (if configured).

In RRC INACTIVE state, a UE specific DRX may be configured by upper layers or by RRC layer; In this state, UE stores the UE Inactive AS context. A RAN-based notification area is configured by RRC layer. The UE monitors Short Messages transmitted with paging radio network temporary identifier (P-RNTI) over DCI; Monitors a Paging channel for core network (CN) paging using 5G-system architecture evolution (SAE)-temporary mobile subscriber identity (5G-S-TMSI) and RAN paging using fullI-RNTI; Performs neighboring cell measurements and cell (re-)selection; Performs radio access node (RAN)-based notification area updates periodically and when moving outside the configured RAN-based notification area; Acquires system information and can send SI request (if configured).

In the RRC_CONNECTED, the UE stores the access stratum (AS) context. Unicast data is transmitted/received to/from UE. At lower layers, the UE may be configured with a UE specific DRX. The UE, monitors Short Messages transmitted with P-RNTI over DCI, if configured; Monitors control channels associated with the shared data channel to determine if data is scheduled for it; Provides channel quality and feedback information; Performs neighboring cell measurements and measurement reporting; Acquires system information.

Beam Failure Recovery in fifth generation wireless communication system: The fifth generation wireless communication system supports a beam failure recovery mechanism at UE for PCell and PSCell. This comprises of beam failure detection, new candidate beam identification, beam failure recovery request transmission and monitoring response for beam failure recovery request. UE monitors SSB or CSI-RSs transmitted periodically by the serving cell (PCell or PSCell) to assess if a beam failure trigger condition has been met and also to identify a new candidate beam. A beam failure is detected on a serving cell if number of consecutive detected beam failure instance exceeds a configured maximum number within a time interval. A beam failure instance means that all serving beam fails (i.e. hypothetical PDCCH block error rate (BLER) determined based on measurement of SSB or CSI-RS is above a threshold). A new candidate beam is the CSI-RS or SSB of serving cell whose measured quality (e.g. reference signal received power (RSRP)) is above a configured threshold. The MAC entity of a cell group shall for each Serving Cell of that cell group configured for beam failure detection perform the following operation: if beam failure instance indication has been received from lower layers (i.e. PHY layer): start or restart the beamFailure-DetectionTimer; increment BFI_COUNTER by 1; if BFI_COUNTER>=beamFailure-InstanceMax-Count:if the Serving Cell is SCell: trigger a BFR for this Serving Cell; else: initiate a Random Access procedure on the SpCell. Note that beam failure recovery (BFR) MAC CE or truncated BFR MAC CE is included in MsgA or Msg3 transmitted during the random access procedure.

If the beamFailureDetectionTimer expires; or if beamFailureDetectionTimer, beam-FailureInstanceMax-Count, or any of the reference signals used for beam failure detection is reconfigured by upper layers associated with this Serving Cell: set BFI_COUNTER to 0.

if the Serving Cell is SpCell and the Random Access procedure initiated for SpCell BFR is successfully completed set BFI_COUNTER to 0;

stop the beamFailureRecoveryTimer, if configured;

consider the Beam Failure Recovery procedure successfully completed.

else if the Serving Cell is SCell, and a PDCCH addressed to C-RNTI indicating uplink grant for a new transmission is received for the HARQ process used for the transmission of the SCell BFR MAC CE or truncated SCell BFR MAC CE which contains beam failure recovery information of this Serving Cell; or if the SCell is deactivated:

set BFI_COUNTER to 0;

consider the Beam Failure Recovery procedure successfully completed and cancel all the triggered BFRs for this Serving Cell.

UE is configured with radio link monitoring reference signal (RLM-RS) resources(s). On each RLM-RS resource, the UE estimates the downlink radio link quality and compare it to the thresholds $Q_{out}$ and $Q_{in}$. Here, $Q_{out}$ is a level at which the downlink radio link cannot be reliably received and corresponds to the out-of-sync block error rate (BLER$_{out}$). $Q_{in}$ is a level at which the downlink radio link quality can be received with higher reliability and correspond to the in-sync block error rate (BLER$_{in}$). BLER$_{out}$ and BLER in are signaled. Out of sync indication is generated when downlink radio link quality on all the configured RLM-RS resources is worse than $Q_{out}$. In sync indication is generated when downlink radio link quality on at least one of the configured RLM-RS resources is better than $Q_{in}$. RRC layer in UE performs RLM based on these indications.

Upon receiving N310 consecutive "out-of-sync" indications for the SpCell from lower layers while neither T300, T301, T304, T311, T316 nor T319 are running, UE start timer T310 for the corresponding SpCell. Upon receiving N311 consecutive "insync" indications for the SpCell from lower layers while T310 is running, the UE shall stop timer T310 for the corresponding SpCell. If T310 expires, RLF is declared.

FIG. 1 illustrates an example of evaluation period in accordance with an embodiment of the disclosure. FIG. 1 illustrates the evaluation period for generating L1 indication (out of sync or in sync indication). FIG. 2 illustrates an example of evaluation period and indication intervals in accordance with an embodiment of the disclosure. A Table in FIG. 2 illustrates the various values of evaluation period and indication interval for RLM based on SSB.

Here, frequent evaluation for RLM may increase UE power consumption for low mobility UEs. So some enhancement is needed without impacting RLF detection.

UE is configured with beam failure detection reference signal (BFD-RS) resources(s). On each BFD-RS resource, the UE estimates the downlink radio link quality and compare it to the thresholds $Q_{out\_LR}$. Here, $Q_{out\_LR}$ is a level at which the downlink radio link cannot be reliably received and corresponds to the block error rate (BLER$_{out\_LR}$ of 10%). Beam Failure Instance indication is generated when downlink radio link quality on all the configured BFD-RS resources is worse than $Q_{out\_LR}$. MAC layer detects beam failure based on this indication and initiate beam failure recovery.

Figure 3:
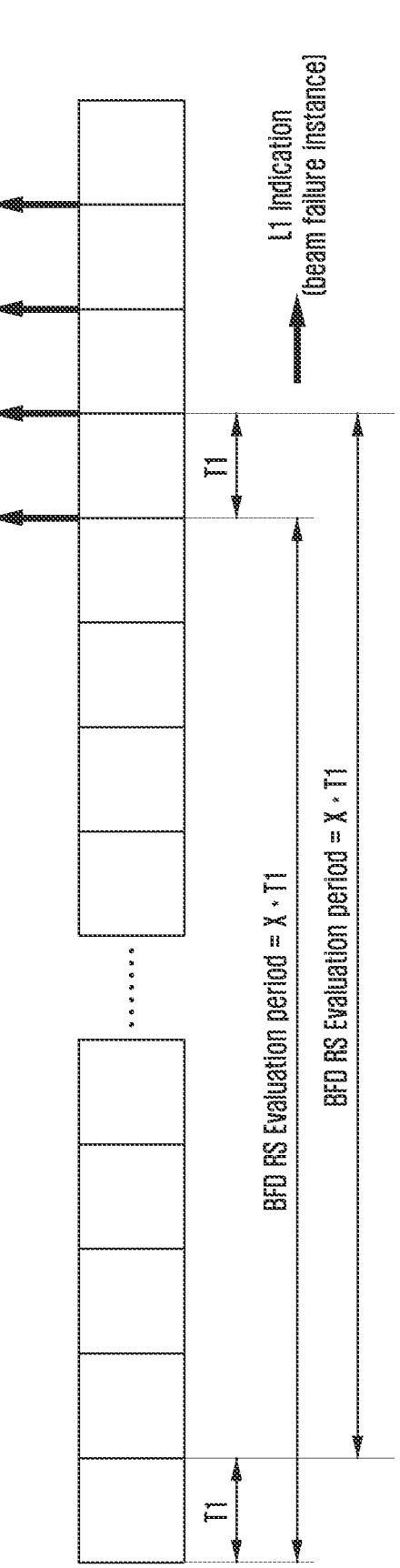
FIG. 3 illustrates another example of evaluation period in accordance with an embodiment of the disclosure.

FIG. 3 illustrates another example of evaluation period in accordance with an embodiment of the disclosure. FIG. 3 illustrates the evaluation period for generating L1 indication (beam failure instance indication). FIG. 4 illustrates another example of evaluation period and indication intervals in accordance with an embodiment of the disclosure. A Table in FIG. 4 illustrates the various values of evaluation period and indication interval for BFD based on SSB.

Here, frequent evaluation for BFD may increase UE power consumption for low mobility UEs. So some enhancement is needed without impacting BFD.

Embodiment 1—RLM Measurements

Embodiment 1-1

In an embodiment of this disclosure, two indication intervals are defined, wherein the first indication interval is $T_{normal\_Indication}$ and second indication interval is $T_{relaxed\_Indication}$ where $T_{relaxed\_Indication}=T_{normal\_Indication}*Y$. The parameter 'Y' is pre-defined or signaled by gNB (e.g. in system information or RRC signaling message). $T_{normal\_Indication}$ corresponds to T1 in FIG. 1 and it has values as given in FIG. 2. In an embodiment, instead of parameter 'Y', $T_{relaxed\_Indication}$ is pre-defined or signaled by gNB (e.g. in system information or RRC signaling message). RRC signaling message can be RRCReconfiguration message or any other dedicated RRC message.

In an embodiment of this disclosure, two evaluation intervals are defined, wherein the first evaluation interval is $T_{normal\_Evaluation}$ and second evaluation interval is $T_{relaxed\_Evaluation}$ where $T_{relaxed\_Evaluation}=T_{normal\_Evaluation}*Y$. The parameter 'Y' is pre-defined or signaled by gNB (e.g. in system information or RRC signaling message). In an embodiment, instead of parameter 'Y', $T_{relaxed\_Evaluation}$ is pre-defined or signaled by gNB (e.g. in system information or RRC signaling message). Note that $T_{normal\_Evaluation}$ for out of sync indication and $T_{normal\_Evaluation}$ for in sync indication can be different. $T_{normal\_Evaluation}$ and $T_{relaxed\_Evaluation}$ interval refers to RLM-RS evaluation period in FIG. 1. $T_{normal\_Evaluation}$ for No DRX, T310 running, short DRX cycle and long DRX cycle are pre-defined (e.g. as in FIG. 2).

The UE operation is as follows:

UE performs RLM measurement i.e. RLM-RS resources based on $T_{normal\_Evaluation}$ and send indication (i.e. L1 indication) every $T_{normal\_Indication}$ Indication Interval. For every $T_{normal\_Indication}$ Indication Interval UE determines the indication based on evaluation of RLM-RS resources for $T_{normal\_Evaluation}$ Note that $T_{normal\_Evaluation}$ for out of sync indication and $T_{normal\_Evaluation}$ for in sync indication can be different. $T_{normal\_Evaluation}$ interval refers to RLM-RS evaluation period in FIG. 1. $T_{normal\_Indication}$ refers to T1 in FIG. 1.

If RLM relaxation is configured (whether to apply RLM relaxation or not can be signaled by gNB in system information or RRC signaling message; or parameters related to RLM relaxation are configured by gNB in in system information or RRC signaling message) & T310 is not running & DRX cycle length<=X, where X can be pre-defined (e.g. X can be 320 ms, 160 ms, 80 ms, etc.) or signaling by gNB in system information or RRC signaling message, UE perform measurements as follows:

(Alternate) If RLM relaxation is configured (whether to apply RLM relaxation or not can be signaled by gNB in system information or RRC signaling message; or parameters related to RLM relaxation are configured by gNB in in system information or RRC signaling message) & DRX cycle length<=X, where X can be pre-defined (e.g. X can be 320 ms, 160 ms, 80 ms, etc) or signaling by gNB in system information or RRC signaling message, UE perform measurements as follows:

(Alternate) If RLM relaxation is configured (whether to apply RLM relaxation or not can be signaled by gNB in system information or RRC signaling message; or parameters related to RLM relaxation are configured by gNB in in system information or RRC signaling message) & T310 is not running & UE is stationary, UE perform measurements as follows:

(Alternate) If RLM relaxation is configured (whether to apply RLM relaxation or not can be signaled by gNB in system information or RRC signaling message; or parameters related to RLM relaxation are configured by gNB in in system information or RRC signaling message) & UE is stationary, UE perform measurements as follows:

(Alternate) If RLM relaxation is configured (whether to apply RLM relaxation or not can be signaled by gNB in system information or RRC signaling message; or parameters related to RLM relaxation are configured by gNB in in system information or RRC signaling message), UE perform measurements as follows:

Upon 'N1' consecutive in Sync indications while performing RLM measurement normally:

UE performs measurement based on $T_{relaxed\_Evaluation}$ and evaluate criteria to generate L1 indication every $T_{relaxed\_Indication}$ Indication Interval. Note that $T_{relaxed\_Evaluation}$ for out of sync indication and $T_{relaxed\_Evaluation}$ for in sync indication can be different. For every $T_{relaxed\_Evaluation}$ Indication Interval UE determines the indication based on evaluation of RLM-RS resources for $T_{relaxed\_Evaluation}$.

N1 is pre-defined or signaled by gNB in system information or RRC signaling message Upon 'N2' consecutive Out of Sync indications while performing RLM measurement in relaxed manner:

UE perform measurement based on $T_{normal\_Evaluation}$ and evaluate criteria to generate L1 indication every $T_{normal\_Indication}$ Indication Interval. Note that $T_{normal\_Evaluation}$ for out of sync indication and $T_{normal\_Evaluation}$ for in sync indication can be different. For every $T_{normal\_Indication}$ Indication Interval UE determines the indication based on evaluation of RLM-RS resources for $T_{normal\_Evaluation}$.

N2 is pre-defined or signaled by gNB in system information or RRC signaling message. N2 can be 1.

Embodiment 1-2

In an embodiment of this disclosure, two indication intervals are defined, wherein the first indication interval is $T_{normal\_Indication}$ and second indication interval is $T_{relaxed\_Indication}$ where $T_{relaxed\_Indication}=T_{normal\_Indication}*Y$. The parameter 'Y' is pre-defined or signaled by gNB e.g. in system information or RRC signaling message. $T_{normal\_Indication}$ corresponds to T1 in FIG. 1 and it has values as given in FIG. 2. In an embodiment, instead of parameter 'Y', $T_{relaxed\_Indication}$ is pre-defined or signaled by gNB (e.g. in system information or RRC signaling message). RRC signaling message can be RRCReconfiguration message or any other dedicated RRC message.

In an embodiment of this disclosure, two evaluation intervals are defined, wherein the first evaluation interval is $T_{normal\_Evaluation}$ and second evaluation interval is $T_{relaxed\_Evaluation}$ where $T_{relaxed\_Evaluation}=T_{normal\_Evaluation}*Y$. The parameter 'Y' is pre-defined or signaled by gNB e.g. in system information or RRC signaling message. In an embodiment, instead of parameter 'Y', $T_{relaxed\_Evaluation}$ is pre defined or signaled by gNB (e.g. in system information or RRC signaling message). RRC signaling message can be RRCReconfiguration message or any other dedicated RRC message. Note that $T_{normal\_Evaluation}$ for out of sync indication and $T_{normal\_Evaluation}$ for in sync indication can be different. $T_{normal\_Evaluation}$ and $T_{relaxed\_Evaluation}$ interval refers to RLM-RS evaluation period in FIG. 1. $T_{normal\_Evaluation}$ for No DRX, T310 running, short DRX cycle and long DRX cycle is pre-defined (e.g. as in FIG. 2).

The UE operation is as follows:

UE performs RLM measurement i.e. RLM-RS resources based on $T_{normal\_Evaluation}$ and send indication (i.e. L1 indication) every $T_{normal\_Indication}$ Indication Interval. For every $T_{normal\_Indication}$ Indication Interval UE determines the indication based on evaluation of RLM-RS resources for $T_{normal\_Evaluation}$. Note that $T_{normal\_Evaluation}$ for out of sync indication and $T_{normal\_Evaluation}$ for in sync indication can be different. $T_{normal\_Evaluation}$ interval refers to RLM-RS evaluation period in FIG. 1. $T_{normal\_Indication}$ refers to T1 in FIG. 1.

If RLM relaxation is configured (whether to apply RLM relaxation or not can be signaled by gNB in system information or RRC signaling message) & T310 is not running & DRX cycle length<=X, where X can be pre-defined (e.g. X can be 320 ms, 160 ms, 80 ms, etc) or signaling by gNB in system information or RRC signaling message, UE perform measurements as follows:

(Alternate) If RLM relaxation is configured (whether to apply RLM relaxation or not can be signaled by gNB in system information or RRC signaling message; or parameters related to RLM relaxation are configured by gNB in in system information or RRC signaling message) & DRX cycle length<=X, where X can be pre-defined (e.g. X can be 320 ms, 160 ms, 80 ms, etc) or signaling by gNB in system information or RRC signaling message, UE perform measurements as follows:

(Alternate) If RLM relaxation is configured (whether to apply RLM relaxation or not can be signaled by gNB in system information or RRC signaling message; or parameters related to RLM relaxation are configured by gNB in in system information or RRC signaling message) & T310 is not running & UE is stationary, UE perform measurements as follows:

(Alternate) If RLM relaxation is configured (whether to apply RLM relaxation or not can be signaled by gNB in system information or RRC signaling message; or parameters related to RLM relaxation are configured by gNB in in system information or RRC signaling message) & UE is stationary, UE perform measurements as follows:

(Alternate) If RLM relaxation is configured (whether to apply RLM relaxation or not can be signaled by gNB in system information or RRC signaling message; or parameters related to RLM relaxation are configured by gNB in in system information or RRC signaling message), UE perform measurements as follows:

If radio link quality (e.g. RSRP, RSRQ, SINR, etc.) of one of the RLM RS resource is >threshold over a time interval (P), where threshold can be pre-defined or signaled by gNB in system information or RRC signaling message:

UE performs measurement based on $T_{relaxed\_Evaluation}$ and evaluate criteria to generate L1 indication every $T_{relaxed\_Indication}$ Indication Interval. Note that $T_{relaxed\_Evaluation}$ for out of sync indication and $T_{relaxed\_Evaluation}$ for in sync indication can be different. For every $T_{relaxed\_Evaluation}$ Indication Interval UE determines the indication based on evaluation of RLM-RS resources for $T_{relaxed\_Evaluation}$.

time interval (P) can be $T_{normal\_Evaluation}$ or $T_{switching-x}$; $T_{switching-x}$ can be pre-defined or signaled by gNB in system information or RRC signaling message If radio link quality of all the RLM RS resources is <threshold over a time interval (Q), where threshold can be pre-defined or signaled by gNB in system information or RRC signaling message UE perform measurement based on $T_{normal\_Evaluation}$ and evaluate criteria to generate L1 indication every $T_{normal\_Indication}$ Indication Interval. Note that $T_{normal\_Evaluation}$ for out of sync indication and $T_{normal\_Evaluation}$ for in sync indication can be different. For every $T_{normal\_Indication}$ Indication Interval UE determines the indication based on evaluation of RLM-RS resources for $T_{normal\_Evaluation}$.

time interval (Q) can be $T_{normal\_Evaluation}$ or $T_{switching-y}$; $T_{switching-y}$ can be pre-defined or signaled by gNB in system information or RRC signaling message.

Embodiment 1-3

In an embodiment of this disclosure, two indication intervals are defined, wherein the first indication interval is $T_{normal\_Indication}$ and second indication interval is $T_{relaxed\_Indication}$ where $T_{relaxed\_Indication}=T_{normal\_Indication}*Y$. The parameter 'Y' is pre-defined or signaled by gNB e.g. in system information or RRC signaling message. $T_{normal\_Indication}$ corresponds to T1 in FIG. 1 and it has values as given in FIG. 2. In an embodiment, instead of parameter 'Y', $T_{relaxed\_Indication}$ is pre-defined or signaled by gNB (e.g. in system information or RRC signaling message). RRC signaling message can be RRCReconfiguration message or any other dedicated RRC message.

In an embodiment of this disclosure, two evaluation intervals are defined, wherein the first evaluation interval is $T_{normal\_Evaluation}$ and second evaluation interval is $T_{relaxed\_Evaluation}$ where $T_{relaxed\_Evaluation}=T_{normal\_Evaluation}*Y$. The parameter 'Y' is pre-defined or signaled by gNB e.g. in system information or RRC signaling message. In an embodiment, instead of parameter 'Y', $T_{relaxed\_Evaluation}$ is pre-defined or signaled by gNB (e.g. in system information or RRC signaling message). RRC signaling message can be RRCReconfiguration message or any other dedicated RRC message. Note that $T_{normal\_Evaluation}$ for out of sync indication and $T_{normal\_Evaluation}$ for in sync indication can be different. $T_{normal\_Evaluation}$ and $T_{relaxed\_Evaluation}$ interval refers to RLM-RS evaluation period in FIG. 1. $T_{normal\_Evaluation}$ for No DRX, T310 running, short DRX cycle and long DRX cycle is pre-defined (e.g. as in FIG. 2).

The UE operation is as follows:

UE performs RLM measurement i.e. RLM-RS resources based on $T_{normal\_Evaluation}$ and send indication (i.e. L1 indication) every $T_{normal\_Indication}$ Indication Interval. For every $T_{normal\_Indication}$ Indication Interval UE determines the indication based on evaluation of RLM-RS resources for $T_{normal\_Evaluation}$. Note that $T_{normal\_Evaluation}$ for out of sync indication and $T_{normal\_Evaluation}$ for in sync indication can be different. $T_{normal\_Evaluation}$ interval refers to RLM-RS evaluation period in FIG. 1. $T_{normal\_Indication}$ refers to T1 in FIG. 1.

If RLM relaxation is configured (whether to apply RLM relaxation or not can be signaled by gNB in system information or RRC signaling message) & T310 is not running & DRX cycle length<=X, where X can be pre-defined (e.g. X can be 320 ms, 160 ms, 80 ms, etc.)

or signaling by gNB in system information or RRC signaling message, UE perform measurements as follows:

(Alternate) If RLM relaxation is configured (whether to apply RLM relaxation or not can be signaled by gNB in system information or RRC signaling message; or parameters related to RLM relaxation are configured by gNB in in system information or RRC signaling message) & DRX cycle length<=X, where X can be pre-defined (e.g. X can be 320 ms, 160 ms, 80 ms, etc) or signaling by gNB in system information or RRC signaling message, UE perform measurements as follows:

(Alternate) If RLM relaxation is configured (whether to apply RLM relaxation or not can be signaled by gNB in system information or RRC signaling message; or parameters related to RLM relaxation are configured by gNB in in system information or RRC signaling message) & T310 is not running & UE is stationary, UE perform measurements as follows:

(Alternate) If RLM relaxation is configured (whether to apply RLM relaxation or not can be signaled by gNB in system information or RRC signaling message; or parameters related to RLM relaxation are configured by gNB in in system information or RRC signaling message) & UE is stationary, UE perform measurements as follows:

(Alternate) If RLM relaxation is configured (whether to apply RLM relaxation or not can be signaled by gNB in system information or RRC signaling message; or parameters related to RLM relaxation are configured by gNB in in system information or RRC signaling message), UE perform measurements as follows:

If cell quality (e.g. RSRP, RSRQ, SINR)>threshold, where threshold can be predefined or signaled by gNB in system information or RRC signaling message:

UE performs measurement based on $T_{relaxed\_Evaluation}$ and evaluate criteria to generate L1 indication every $T_{relaxed\_Indication}$ Indication Interval. Note that $T_{relaxed\_Evaluation}$ for out of sync indication and $T_{relaxed\_Evaluation}$ for in sync indication can be different. For every $T_{relaxed\_Evaluation}$ Indication Interval UE determines the indication based on evaluation of RLM-RS resources for $T_{relaxed\_Evaluation}$.

Else

UE perform measurement based on $T_{normal\_Evaluation}$ and evaluate criteria to generate L1 indication every $T_{normal\_Indication}$ Indication Interval. Note that $T_{normal\_Evaluation}$ for out of sync indication and $T_{normal\_Evaluation}$ for in sync indication can be different. For every $T_{normal\_Indication}$ Indication Interval UE determines the indication based on evaluation of RLM-RS resources for $T_{normal\_Evaluation}$.

Embodiment 1-4

In an embodiment of this disclosure, two indication intervals are defined, wherein the first indication interval is $T_{normal\_Indication}$ and second indication interval is $T_{relaxed\_Indication}$ where $T_{relaxed\_Indication}=T_{normal\_Indication}*Y$. The parameter 'Y' is pre-defined or signaled by gNB e.g. in system information or RRC signaling message. $T_{normal\_Indication}$ corresponds to T1 in FIG. 1 and it has values as given in FIG. 2. In an embodiment, instead of parameter 'Y', $T_{relaxed\_Indication}$ is pre-defined or signaled by gNB (e.g. in system information or RRC signaling message). RRC signaling message can be RRCReconfiguration message or any other dedicated RRC message.

In an embodiment of this disclosure, two evaluation intervals are defined, wherein the first evaluation interval is $T_{normal\_Evaluation}$ and second evaluation interval is $T_{relaxed\_Evaluation}$ where $T_{relaxed\_Evaluation}=T_{normal\_Evaluation}*Y$. The parameter 'Y' is pre-defined or signaled by gNB e.g. in system information or RRC signaling message. In an embodiment, instead of parameter 'Y', $T_{relaxed\_Evaluation}$ is pre-defined or signaled by gNB (e.g. in system information or RRC signaling message). RRC signaling message can be RRCReconfiguration message or any other dedicated RRC message. Note that T normal_Evaluation for out of sync indication and $T_{normal\_Evaluation}$ for in sync indication can be different. $T_{normal\_Evaluation}$ and $T_{relaxed\_Evaluation}$ interval refers to RLM-RS evaluation period in FIG. 1. $T_{normal\_Evaluation}$ for No DRX, T310 running, short DRX cycle and long DRX cycle is pre-defined (e.g. as in FIG. 2).

The UE operation is as follows:

UE performs RLM measurement i.e. RLM-RS resources based on $T_{normal\_Evaluation}$ and send indication (i.e. L1 indication) every $T_{normal\_Indication}$ Indication Interval. For every $T_{normal\_Indication}$ Indication Interval UE determines the indication based on evaluation of RLM-RS resources for $T_{normal\_Evaluation}$ Note that $T_{normal\_Evaluation}$ for out of sync indication and $T_{normal\_Evaluation}$ for in sync indication can be different. $T_{normal\_Evaluation}$ interval refers to RLM-RS evaluation period in FIG. 1. $T_{normal\_Indication}$ refers to T1 in FIG. 1.

If RLM relaxation is configured (whether to apply RLM relaxation or not can be signaled by gNB in system information or RRC signaling message) & T310 is not running & DRX cycle length<=X, where X can be pre-defined (e.g. X can be 320 ms, 160 ms, 80 ms, etc.) or signaling by gNB in system information or RRC signaling message, UE perform measurements as follows:

(Alternate) If RLM relaxation is configured (whether to apply RLM relaxation or not can be signaled by gNB in system information or RRC signaling message; or parameters related to RLM relaxation are configured by gNB in in system information or RRC signaling message) & DRX cycle length<=X, where X can be pre-defined (e.g. X can be 320 ms, 160 ms, 80 ms, etc.) or signaling by gNB in system information or RRC signaling message, UE perform measurements as follows:

(Alternate) If RLM relaxation is configured (whether to apply RLM relaxation or not can be signaled by gNB in system information or RRC signaling message; or parameters related to RLM relaxation are configured by gNB in in system information or RRC signaling message) & T310 is not running & UE is stationary, UE perform measurements as follows:

(Alternate) If RLM relaxation is configured (whether to apply RLM relaxation or not can be signaled by gNB in system information or RRC signaling message; or parameters related to RLM relaxation are configured by gNB in in system information or RRC signaling message) & UE is stationary, UE perform measurements as follows:

(Alternate) If RLM relaxation is configured (whether to apply RLM relaxation or not can be signaled by gNB in system information or RRC signaling message; or parameters related to RLM relaxation are configured by gNB in in system information or RRC signaling message), UE perform measurements as follows:

If RSRP (or RSRQ or SINR) of cell has not changed by amount>threshold over a time interval (P), where threshold can be pre-defined or signaled by gNB in system information or RRC signaling message:

UE performs measurement based on $T_{relaxed\_Evaluation}$ and evaluate criteria to generate L1 indication every $T_{relaxed\_Indication}$ Indication Interval. Note that $T_{relaxed\_Evaluation}$ for out of sync indication and $T_{relaxed\_Evaluation}$ for in sync indication can be different. For every $T_{relaxed\_Evaluation}$ Indication Interval UE determines the indication based on evaluation of RLM-RS resources for $T_{relaxed\_Evaluation}$.

time interval (P) can be $T_{normal\_Evaluation}$ or $T_{switching-x}$; $T_{switching-x}$ can be pre-defined or signaled by gNB in system information or RRC signaling message.

Else

UE perform measurement based on $T_{normal\_Evaluation}$ and evaluate criteria to generate L1 indication every $T_{normal\_Indication}$ Indication Interval. Note that $T_{normal\_Evaluation}$ for out of sync indication and $T_{normal\_Evaluation}$ for in sync indication can be different. For every $T_{normal\_Indication}$ Indication Interval UE determines the indication based on evaluation of RLM-RS resources for $T_{normal\_Evaluation}$.

Embodiment 1-5

In an embodiment of this disclosure, two indication intervals are defined, wherein the first indication interval is $T_{normal\_Indication}$ and second indication interval is $T_{relaxed\_Indication}$ where $T_{relaxed\_Indication}=T_{normal\_Indication}*Y$. The parameter 'Y' is pre-defined or signaled by gNB e.g. in system information or RRC signaling message. $T_{normal\_Indication}$ is T1 in FIG. 1 and it has values as given in FIG. 2. In an embodiment, instead of parameter 'Y', $T_{relaxed\_Indication}$ is pre-defined or signaled by gNB (e.g. in system information or RRC signaling message). RRC signaling message can be RRCReconfiguration message or any other dedicated RRC message.

In an embodiment of this disclosure, two evaluation intervals are defined, wherein the first evaluation interval is $T_{normal\_Evaluation}$ and second evaluation interval is $T_{relaxed\_Evaluation}$ where $T_{relaxed\_Evaluation}=T_{normal\_Evaluation}*Y$. The parameter 'Y' is pre-defined or signaled by gNB e.g. in system information or RRC signaling message. In an embodiment, instead of parameter 'Y', $T_{relaxed\_Evaluation}$ is pre defined or signaled by gNB (e.g. in system information or RRC signaling message). RRC signaling message can be RRCReconfiguration message or any other dedicated RRC message. Note that $T_{normal\_Evaluation}$ for out of sync indication and $T_{normal\_Evaluation}$ for in sync indication can be different. $T_{normal\_Evaluation}$ and $T_{relaxed\_Evaluation}$ interval refers to RLM-RS evaluation period in FIG. 1. $T_{normal\_Evaluation}$ for No DRX, T310 running, short DRX cycle and long DRX cycle is pre-defined (e.g. as in FIG. 2).

The UE operation is as follows:

UE performs RLM measurement i.e. RLM-RS resources based on $T_{normal\_Evaluation}$ and evaluate criteria to generate indication (i.e. L1 indication) every $T_{normal\_Indication}$ Indication Interval. For every $T_{normal\_Indication}$ cation Interval UE determines the indication based on evaluation of RLM-RS resources for $T_{normal\_Evaluation}$. Note that $T_{normal\_Evaluation}$ for out of sync indication and $T_{normal\_Evaluation}$ for in sync indication can be different. $T_{normal\_Evaluation}$ interval refers to RLM-RS evaluation period in FIG. 1. $T_{normal\_Indication}$ refers to T1 in FIG. 1.

If RLM relaxation is configured (whether to apply RLM relaxation or not can be signaled by gNB in system information or RRC signaling message) & T310 is not running UE perform measurements as follows: or (Alternate) If RLM relaxation is configured (whether to apply RLM relaxation or not can be signaled by gNB in system information or RRC signaling message), UE perform measurements as follows:

UE performs measurement based on $T_{relaxed\_Evaluation}$ and evaluate criteria to generate indication every $T_{relaxed\_Indication}$ Indication Interval. Note that $T_{relaxed\_Evaluation}$ for out of sync indication and $T_{relaxed\_Evaluation}$ for in sync indication can be different. For every $T_{relaxed\_Evaluation}$ Indication Interval UE determines the indication based on evaluation of RLM-RS resources for $T_{relaxed\_Evaluation}$.

In all the embodiments above for RLM measurements, UE will indicate to GNB weather is supports RLM relaxation in UE capability information message or any other signaling message. If UE supports RLM relaxation, gNB can configure and/or indicate RLM relaxation to UE. The configuration and/or indication to perform RLM relaxation can be per serving cell or per cell group or per carrier frequency.

Embodiment 2—BFD Measurements

Embodiment 2-1

In an embodiment of this disclosure, two indication intervals are defined, wherein the first indication interval is $T_{normal\_Indication}$ and second indication interval is $T_{relaxed\_Indication}$ where $T_{relaxed\_Indication}=T_{normal\_Indication}*Y$. The parameter 'Y' is pre-defined or signaled by gNB e.g. in system information or RRC signaling message. In an embodiment, instead of parameter 'Y', $T_{relaxed\_Indication}$ is pre-defined or signaled by gNB (e.g. in system information or RRC signaling message). RRC signaling message can be RRCReconfiguration message or any other dedicated RRC message. $T_{normal\_Indication}$ corresponds to T1 in FIG. 3 and it has values as given in FIG. 4.

In an embodiment of this disclosure, two evaluation intervals are defined, wherein the first evaluation interval is $T_{normal\_Evaluation}$ and second evaluation interval is T relaxed_Evaluation where $T_{relaxed\_Evaluation}=T_{normal\_Evaluation}*Y$. The parameter 'Y' is pre-defined or signaled by gNB e.g. in system information or RRC signaling message. In an embodiment, instead of parameter 'Y', $T_{relaxed\_Evaluation}$ is pre-defined or signaled by gNB (e.g. in system information or RRC signaling message). RRC signaling message can be RRCReconfiguration message or any other dedicated RRC message. $T_{normal\_Evaluation}$ and $T_{relaxed\_Evaluation}$ interval refers to BFD-RS evaluation period in FIG. 3. $T_{normal\_Evaluation}$ for No DRX, short DRX cycle and long DRX cycle is pre-defined (e.g. as in FIG. 4).

The UE operation is as follows:

UE performs BFD measurement i.e. BFD-RS resources based on $T_{normal\_Evaluation}$ and evaluate criteria to generate indication (i.e. Beam failure instance indication) every T normal_Indication Indication Interval. For every $T_{normal\_Indication}$ Indication Interval UE evaluate criteria to generate indication based on evaluation of BFD-RS resources for T normal_Evaluation $T_{normal\_Evaluation}$ interval refers to BFD-RS evaluation period in FIG. 3. T normal_Indication refers to T1 in FIG. 3.

If BFD relaxation is configured (whether to apply BFD relaxation or not can be signaled by gNB in system information or RRC signaling message; or parameters related to BFD relaxation are configured by gNB in in system information or RRC signaling message), UE perform measurements as follows:

(Alternate) If BFD relaxation is configured (whether to apply BFD relaxation or not can be signaled by gNB in system information or RRC signaling message; or parameters related to BFD relaxation are configured by gNB in in system information or RRC signaling message) & DRX cycle length<=X, where X can be pre-defined (e.g. X can be 320 ms, 160 ms, 80 ms, etc.) or signaling by gNB in system information or RRC signaling message, UE perform measurements as follows:

(Alternate) If BFD relaxation is configured (whether to apply BFD relaxation or not can be signaled by gNB in system information or RRC signaling message; or parameters related to BFD relaxation are configured by gNB in in system information or RRC signaling message) & BFD timer is not running, UE perform measurements as follows:

(Alternate) If BFD relaxation is configured (whether to apply BFD relaxation or not can be signaled by gNB in system information or RRC signaling message; or parameters related to BFD relaxation are configured by gNB in in system information or RRC signaling message) & DRX cycle length<=X and BFD timer is not running, where X can be pre-defined (e.g. X can be 320 ms, 160 ms, 80 ms, etc.) or signaling by gNB in system information or RRC signaling message, UE perform measurements as follows:

(Alternate) If BFD relaxation is configured (whether to apply BFD relaxation or not can be signaled by gNB in system information or RRC signaling message; or parameters related to BFD relaxation are configured by gNB in in system information or RRC signaling message) & UE is stationary, UE perform measurements as follows:

(Alternate) If BFD relaxation is configured (whether to apply BFD relaxation or not can be signaled by gNB in system information or RRC signaling message; or parameters related to BFD relaxation are configured by gNB in in system information or RRC signaling message) & UE is stationary and BFD timer is not running, UE perform measurements as follows:

(Alternate) If BFD relaxation is configured (whether to apply BFD relaxation or not can be signaled by gNB in system information or RRC signaling message; or parameters related to BFD relaxation are configured by gNB in in system information or RRC signaling message) & UE is stationary and BFD timer is not running and DRX cycle length<=X, UE perform measurements as follows:

Upon 'N1' consecutive intervals of no beam failure indication while performing BFD measurement normally:

UE performs measurement based on $T_{relaxed\_Evaluation}$ and evaluate criteria to generate indication (i.e. Beam failure instance indication) every $T_{relaxed\_Indication}$ Indication Interval. For every $T_{relaxed\_Evaluation}$ Indication Interval UE evaluate criteria to generate indication based on evaluation of BFD-RS resources for $T_{relaxed\_Evaluation}$.

N1 is pre-defined or signaled by gNB in system information or RRC signaling message.

Upon 'N2' consecutive beam failure indications while performing BFD measurement in relaxed manner:

UE perform measurement based on $T_{normal\_Evaluation}$ and evaluate criteria to generate indication (i.e. Beam failure instance indication) every $T_{normal\_Indication}$ Indication Interval. For every $T_{normal\_Indication}$ Indication Interval UE evaluate criteria to generate indication (i.e. Beam failure instance indication) based on evaluation of BFD-RS resources for $T_{normal\_Evaluation}$ N2 is pre-defined or signaled by gNB in system information or RRC signaling message. N2 can be 1.

Embodiment 2-2

In an embodiment of this disclosure, two indication intervals are defined, wherein the first indication interval is $T_{normal\_Indication}$ and second indication interval is $T_{relaxed\_Indication}$ where $T_{relaxed\_Indication} = T_{normal\_Indication} * Y$. The parameter 'Y' is pre-defined or signaled by gNB e.g. in system information or RRC signaling message. In an embodiment, instead of parameter 'Y', $T_{relaxed\_Indication}$ is pre-defined or signaled by gNB (e.g. in system information or RRC signaling message). RRC signaling message can be RRCReconfiguration message or any other dedicated RRC message. $T_{normal\_Indication}$ corresponds to T1 in FIG. 3 and it has values as given in FIG. 4.

In an embodiment of this disclosure, two evaluation intervals are defined, wherein the first evaluation interval is $T_{normal\_Evaluation}$ and second evaluation interval is T relaxed_Evaluation where $T_{relaxed\_Evaluation} = T_{normal\_Evaluation} * Y$. The parameter 'Y' is pre-defined or signaled by gNB e.g. in system information or RRC signaling message. In an embodiment, instead of parameter 'Y', $T_{relaxed\_Evaluation}$ is pre-defined or signaled by gNB (e.g. in system information or RRC signaling message). RRC signaling message can be RRCReconfiguration message or any other dedicated RRC message. $T_{normal\_Evaluation}$ and $T_{relaxed\_Evaluation}$ interval refers to BFD-RS evaluation period in FIG. 3. $T_{normal\_Evaluation}$ for No DRX, short DRX cycle and long DRX cycle is pre-defined (e.g. as in FIG. 4).

The UE operation is as follows:

UE performs BFD measurement i.e. BFD-RS resources based on $T_{normal\_Evaluation}$ and evaluate criteria to generate indication (i.e. Beam failure instance indication) every $T_{normal\_Indication}$ Indication Interval. For every $T_{normal\_Indication}$ Indication Interval UE evaluate criteria to generate indication based on evaluation of BFD-RS resources for $T_{normal\_Evaluation}$ $T_{normal\_Evaluation}$ interval refers to BFD-RS evaluation period in FIG. 3. T normal_Indication refers to T1 in FIG. 3.

If BFD relaxation is configured (whether to apply BFD relaxation or not can be signaled by gNB in system information or RRC signaling message; or parameters related to BFD relaxation are configured by gNB in in system information or RRC signaling message), UE perform measurements as follows:

(Alternate) If BFD relaxation is configured (whether to apply BFD relaxation or not can be signaled by gNB in system information or RRC signaling message; or parameters related to BFD relaxation are configured by gNB in in system information or RRC signaling message) & DRX cycle length<=X, where X can be predefined (e.g. X can be 320 ms, 160 ms, 80 ms, etc.) or signaling by gNB in system information or RRC signaling message, UE perform measurements as follows:

(Alternate) If BFD relaxation is configured (whether to apply BFD relaxation or not can be signaled by gNB in system information or RRC signaling message; or parameters related to BFD relaxation are configured by gNB in in system information or RRC signaling message) & BFD timer is not running, UE perform measurements as follows:

(Alternate) If BFD relaxation is configured (whether to apply BFD relaxation or not can be signaled by gNB in system information or RRC signaling message; or parameters related to BFD relaxation are configured by gNB in in system information or RRC signaling message) & DRX cycle length<=X and BFD timer is not running, where X can be pre-defined (e.g. X can be 320 ms, 160 ms, 80 ms, etc.) or signaling by gNB in system information or RRC signaling message, UE perform measurements as follows:

(Alternate) If BFD relaxation is configured (whether to apply BFD relaxation or not can be signaled by gNB in system information or RRC signaling message; or parameters related to BFD relaxation are configured by gNB in in system information or RRC signaling message) & UE is stationary, UE perform measurements as follows:

(Alternate) If BFD relaxation is configured (whether to apply BFD relaxation or not can be signaled by gNB in system information or RRC signaling message; or parameters related to BFD relaxation are configured by gNB in in system information or RRC signaling message) & UE is stationary and BFD timer is not running, UE perform measurements as follows:

(Alternate) If BFD relaxation is configured (whether to apply BFD relaxation or not can be signaled by gNB in system information or RRC signaling message; or parameters related to BFD relaxation are configured by gNB in in system information or RRC signaling message) & UE is stationary and BFD timer is not running and DRX cycle length<=X, UE perform measurements as follows:

If radio link quality of one of the BFD RS resource is >threshold over a time interval (P), where threshold can be pre-defined or signaled by gNB in system information or RRC signaling message:

UE performs measurement based on $T_{relaxed\_Evaluation}$ and evaluate criteria to generate indication (i.e. Beam failure instance indication) every $T_{relaxed\_Indication}$ Indication Interval. For every $T_{relaxed\_Evaluation}$ Indication Interval UE evaluate criteria to generate indication based on evaluation of BFD-RS resources for $T_{relaxed\_Evaluation}$.

time interval (P) can be $T_{normal\_Evaluation}$ or $T_{switching}$; $T_{switching}$ can be pre-defined or signaled by gNB in system information or RRC signaling message.

If radio link quality (e.g. RSRP, RSRQ, SINR) of all the BFD RS resources is <threshold over a time interval (P)

UE perform measurement based on $T_{normal\_Evaluation}$ and evaluate criteria to generate indication (i.e. Beam failure instance indication) every $T_{normal\_Indication}$ Indication Interval. For every $T_{normal\_Indication}$ Indication Interval UE evaluate criteria to generate indication (i.e. Beam failure instance indication) based on evaluation of BFD-RS resources for $T_{normal\_Evaluation}$.

time interval (P) can be $T_{normal\_Evaluation}$ or $T_{switching}$; $T_{switching}$ can be pre-defined or signaled by gNB in system information or RRC signaling message.

Embodiment 2-3

In an embodiment of this disclosure, two indication intervals are defined, wherein the first indication interval is $T_{normal\_Indication}$ and second indication interval is $T_{relaxed\_Indication}$ where $T_{relaxed\_Indication}=T_{normal\_Indication}$ Y. The parameter 'Y' is pre-defined or signaled by gNB e.g. in system information or RRC signaling message. In an embodiment, instead of parameter 'Y', $T_{relaxed\_Indication}$ is pre-defined or signaled by gNB (e.g. in system information or RRC signaling message). RRC signaling message can be RRCReconfiguration message or any other dedicated RRC message. $T_{normal\_Indication}$ corresponds to T1 in FIG. 3 and it has values as given in FIG. 4.

In an embodiment of this disclosure, two evaluation intervals are defined, wherein the first evaluation interval is $T_{normal\_Evaluation}$ and second evaluation interval is $T_{relaxed\_Evaluation}$ where $T_{relaxed\_Evaluation}=T_{normal\_Evaluation}*Y$. The parameter 'Y' is pre-defined or signaled by gNB e.g. in system information or RRC signaling message. In an embodiment, instead of parameter 'Y', $T_{relaxed\_Evaluation}$ is pre-defined or signaled by gNB (e.g. in system information or RRC signaling message). RRC signaling message can be RRCReconfiguration message or any other dedicated RRC message. $T_{normal\_Evaluation}$ and $T_{relaxed\_Evaluation}$ interval refers to BFD-RS evaluation period in FIG. 3. $T_{normal\_Evaluation}$ for No DRX, short DRX cycle and long DRX cycle is pre-defined (e.g. as in FIG. 4).

The UE operation is as follows:

UE performs BFD measurement i.e. BFD-RS resources based on $T_{normal\_Evaluation}$ and evaluate criteria to generate indication (i.e. Beam failure instance indication) every $T_{normal\_Indication}$ Indication Interval. For every $T_{normal\_Indication}$ Indication Interval UE evaluate criteria to generate indication based on evaluation of BFD-RS resources for $T_{normal\_Evaluation}$. $T_{normal\_Evaluation}$ interval refers to BFD-RS evaluation period in FIG. 3. $T_{normal\_Indication}$ refers to T1 in FIG. 3.

If BFD relaxation is configured (whether to apply BFD relaxation or not can be signaled by gNB in system information or RRC signaling message; or parameters related to BFD relaxation are configured by gNB in in system information or RRC signaling message), UE perform measurements as follows:

(Alternate) If BFD relaxation is configured (whether to apply BFD relaxation or not can be signaled by gNB in system information or RRC signaling message; or parameters related to BFD relaxation are configured by gNB in in system information or RRC signaling message) & DRX cycle length<=X, where X can be pre-defined (e.g. X can be 320 ms, 160 ms, 80 ms, etc.) or signaling by gNB in system information or RRC signaling message, UE perform measurements as follows:

(Alternate) If BFD relaxation is configured (whether to apply BFD relaxation or not can be signaled by gNB in system information or RRC signaling message; or parameters related to BFD relaxation are configured by gNB in in system information or RRC signaling message) & BFD timer is not running, UE perform measurements as follows:

(Alternate) If BFD relaxation is configured (whether to apply BFD relaxation or not can be signaled by gNB in system information or RRC signaling message; or parameters related to BFD relaxation are configured by gNB in in system information or RRC signaling message) & DRX cycle length<=X and BFD timer is not running, where X can be pre-defined (e.g. X can be 320 ms, 160 ms, 80 ms, etc.) or signaling by gNB in system information or RRC signaling message, UE perform measurements as follows:

(Alternate) If BFD relaxation is configured (whether to apply BFD relaxation or not can be signaled by gNB in system information or RRC signaling message; or parameters related to BFD relaxation are configured by gNB in in system information or RRC signaling message) & UE is stationary, UE perform measurements as follows:

(Alternate) If BFD relaxation is configured (whether to apply BFD relaxation or not can be signaled by gNB in system information or RRC signaling message; or parameters related to BFD relaxation are configured by gNB in in system information or RRC signaling message) & UE is stationary and BFD timer is not running, UE perform measurements as follows:

(Alternate) If BFD relaxation is configured (whether to apply BFD relaxation or not can be signaled by gNB in system information or RRC signaling message; or parameters related to BFD relaxation are configured by gNB in in system information or RRC signaling message) & UE is stationary and BFD timer is not running and DRX cycle length<=X, UE perform measurements as follows:

cell quality (e.g. RSRP, RSRQ, SINR)>threshold, where threshold can be predefined or signaled by gNB in system information or RRC signaling message:

UE performs measurement based on $T_{relaxed\_Evaluation}$ and evaluate criteria to generate indication (i.e. Beam failure instance indication) every $T_{relaxed\_Indication}$ Indication Interval. For every $T_{relaxed\_Evaluation}$ Indication Interval UE evaluate criteria to generate indication based on evaluation of BFD-RS resources for $T_{relaxed\_Evaluation}$.

else

UE perform measurement based on $T_{normal\_Evaluation}$ and evaluate criteria to generate indication (i.e. Beam failure instance indication) every $T_{normal\_Indication}$ Indication Interval. For every $T_{normal\_Indication}$ Indication Interval UE evaluate criteria to generate indication (i.e. Beam failure instance indication) based on evaluation of BFD-RS resources for $T_{normal\_Evaluation}$.

Embodiment 2-4

In an embodiment of this disclosure, two indication intervals are defined, wherein the first indication interval is $T_{normal\_Indication}$ and second indication interval is $T_{relaxed\_Indication}$ where $T_{relaxed\_Indication}=T_{normal\_Indication}*Y$. The parameter 'Y' is pre-defined or signaled by gNB e.g. in system information or RRC signaling message. In an embodiment, instead of parameter 'Y', $T_{relaxed\_Indication}$ is pre-defined or signaled by gNB (e.g. in system information or RRC signaling message). RRC signaling message can be RRCReconfiguration message or any other dedicated RRC message. $T_{normal\_Indication}$ corresponds to T1 in FIG. 3 and it has values as given in FIG. 4.

In an embodiment of this disclosure, two evaluation intervals are defined, wherein the first evaluation interval is $T_{normal\_Evaluation}$ and second evaluation interval is $T_{relaxed\_Evaluation}$ where $T_{relaxed\_Evaluation}=T_{normal\_Evaluation}*Y$. The parameter 'Y' is pre-defined or signaled by gNB e.g. in system information or RRC signaling message. In an embodiment, instead of parameter 'Y', $T_{relaxed\_Evaluation}$ is pre-defined or signaled by gNB (e.g. in system information or RRC signaling message). RRC signaling message can be RRCReconfiguration message or any other dedicated RRC message. $T_{normal\_Evaluation}$ and $T_{relaxed\_Evaluation}$ interval refers to BFD-RS evaluation period in FIG. 3. $T_{normal\_Evaluation}$ for No DRX, short DRX cycle and long DRX cycle is pre-defined (e.g. as in FIG. 4).

The UE operation is as follows:

UE performs BFD measurement i.e. BFD-RS resources based on $T_{normal\_Evaluation}$ and evaluate criteria to generate indication (i.e. Beam failure instance indication) every T normal_Indication Indication Interval. For every $T_{normal\_Indication}$ Indication Interval UE evaluate criteria to generate indication based on evaluation of BFD-RS resources for T normal_Evaluation $T_{normal\_Evaluation}$ interval refers to BFD-RS evaluation period in FIG. 3. T normal_Indication refers to T1 in FIG. 3.

If BFD relaxation is configured (whether to apply BFD relaxation or not can be signaled by gNB in system information or RRC signaling message; or parameters related to BFD relaxation are configured by gNB in in system information or RRC signaling message), UE perform measurements as follows:

(Alternate) If BFD relaxation is configured (whether to apply BFD relaxation or not can be signaled by gNB in system information or RRC signaling message; or parameters related to BFD relaxation are configured by gNB in in system information or RRC signaling message) & DRX cycle length<=X, where X can be pre-defined (e.g. X can be 320 ms, 160 ms, 80 ms, etc.) or signaling by gNB in system information or RRC signaling message, UE perform measurements as follows:

(Alternate) If BFD relaxation is configured (whether to apply BFD relaxation or not can be signaled by gNB in system information or RRC signaling message; or parameters related to BFD relaxation are configured by gNB in in system information or RRC signaling message) & BFD timer is not running, UE perform measurements as follows:

(Alternate) If BFD relaxation is configured (whether to apply BFD relaxation or not can be signaled by gNB in system information or RRC signaling message; or parameters related to BFD relaxation are configured by gNB in in system information or RRC signaling message) & DRX cycle length<=X and BFD timer is not running, where X can be pre-defined (e.g. X can be 320 ms, 160 ms, 80 ms, etc.) or signaling by gNB in system information or RRC signaling message, UE perform measurements as follows:

(Alternate) If BFD relaxation is configured (whether to apply BFD relaxation or not can be signaled by gNB in system information or RRC signaling message; or parameters related to BFD relaxation are configured by gNB in in system information or RRC signaling message) & UE is stationary, UE perform measurements as follows:

(Alternate) If BFD relaxation is configured (whether to apply BFD relaxation or not can be signaled by gNB in system information or RRC signaling message; or parameters related to BFD relaxation are configured by gNB in in system information or RRC signaling message) & UE is stationary and BFD timer is not running, UE perform measurements as follows:

(Alternate) If BFD relaxation is configured (whether to apply BFD relaxation or not can be signaled by gNB in system information or RRC signaling message; or parameters related to BFD relaxation are configured by gNB in in system information or RRC signaling message) & UE is stationary and BFD timer is not running and DRX cycle length<=X, UE perform measurements as follows:

If RSRP (or RSRQ or SINR) of cell has not changed by amount>threshold over a time interval (P), where threshold can be pre-defined or signaled by gNB in system information or RRC signaling message:

UE performs measurement based on $T_{relaxed\_Evaluation}$ and evaluate criteria to generate indication (i.e. Beam failure instance indication) every $T_{relaxed\_Indication}$ Indication Interval. For every $T_{relaxed\_Evaluation}$ Indication Interval UE evaluate criteria to generate indication based on evaluation of BFD-RS resources for $T_{relaxed\_Evaluation}$.

time interval (P) can be $T_{normal\_Evaluation}$ or $T_{switching}$; $T_{switching}$ can be pre-defined or signaled by gNB in system information or RRC signaling message.

else

UE perform measurement based on $T_{normal\_Evaluation}$ and evaluate criteria to generate indication (i.e. Beam failure instance indication) every $T_{normal\_Indication}$ Indication Interval. For every $T_{normal\_Indication}$ Indication Interval UE evaluate criteria to generate indication (i.e. Beam failure instance indication) based on evaluation of BFD-RS resources for $T_{normal\_Evaluation}$ time interval (P) can be $T_{normal\_Evaluation}$ or $T_{switching}$; $T_{switching}$ can be pre-defined or signaled by gNB in system information or RRC signaling message.

Embodiment 2-5

In an embodiment of this disclosure, two indication intervals are defined, wherein the first indication interval is $T_{normal\_Indication}$ and second indication interval is $T_{relaxed\_Indication}$ where $T_{relaxed\_Indication}=T_{normal\_Indication}*Y$. The parameter 'Y' is pre-defined or signaled by gNB e.g. in system information or RRC signaling message. In an embodiment, instead of parameter 'Y', $T_{relaxed\_Indication}$ is pre-defined or signaled by gNB (e.g. in system information or RRC signaling message). RRC signaling message can be RRCReconfiguration message or any other dedicated RRC message. $T_{normal\_Indication}$ corresponds to T1 in FIG. 3 and it has values as given in FIG. 4.

In an embodiment of this disclosure, two evaluation intervals are defined, wherein the first evaluation interval is $T_{normal\_Evaluation}$ and second evaluation interval is $T_{relaxed\_Evaluation}$ where $T_{relaxed\_Evaluation}=T_{normal\_Evaluation}*Y$. The parameter 'Y' is pre-defined or signaled by gNB e.g. in system information or RRC signaling message. In an embodiment, instead of parameter $T_{relaxed\_Evaluation}$ is pre-defined or signaled by gNB (e.g. in system information or RRC signaling message). RRC signaling message can be RRCReconfiguration message or any other dedicated RRC message. $T_{normal\_Evaluation}$ and $T_{relaxed\_Evaluation}$ interval refers to BFD-RS evaluation period in FIG. 3. $T_{normal\_Evaluation}$ for No DRX, short DRX cycle and long DRX cycle is pre-defined (e.g. as in FIG. 4).

The UE operation is as follows:

UE performs BFD measurement i.e. BFD-RS resources based on $T_{normal\_Evaluation}$ and evaluate criteria to generate indication (i.e. Beam failure instance indication) every T normal_Indication Indication Interval. For every $T_{normal\_Indication}$ Indication Interval UE evaluate criteria to generate indication based on evaluation of BFD-RS resources for $T_{normal\_Evaluation}$. $T_{normal\_Evaluation}$ interval refers to BFD-RS evaluation period in FIG. 3. $T_{normal\_Indication}$ refers to T1 in FIG. 3.

If BFD relaxation is configured (whether to apply BFD relaxation or not can be signaled by gNB in system information or RRC signaling message), UE perform measurements as follows:

(Alternate) If BFD relaxation is configured (whether to apply BFD relaxation or not can be signaled by gNB in system information or RRC signaling message) & BFD timer is not running, UE perform measurements as follows:

(Alternate) If BFD relaxation is configured (whether to apply BFD relaxation or not can be signaled by gNB in system information or RRC signaling message) & DRX cycle length<=X, UE perform measurements as follows:

If BFD relaxation is configured (whether to apply BFD relaxation or not can be signaled by gNB in system information or RRC signaling message) & BFD timer is not running and DRX cycle length<=X, UE perform measurements as follows:

UE performs measurement based on $T_{relaxed\_Evaluation}$ and evaluate criteria to generate indication every $T_{relaxed\_Indication}$ Indication Interval. Note that $T_{relaxed\_Evaluation}$ for out of sync indication and $T_{relaxed\_Evaluation}$ for in sync indication can be different. For every $T_{relaxed\_Evaluation}$ Indication Interval UE determines the indication based on evaluation of RLM-RS resources for $T_{relaxed\_Evaluation}$.

Else

UE performs BFD measurement i.e. BFD-RS resources based on $T_{normal\_Evaluation}$ and evaluate criteria to generate indication (i.e. Beam failure instance indication) every $T_{normal\_Indication}$ Indication Interval. For every $T_{normal\_Indication}$ Indication Interval UE evaluate criteria to generate indication based on evaluation of BFD-RS resources for $T_{normal\_Evaluation}$. $T_{normal\_Evaluation}$ interval refers to BFD-RS evaluation period in FIG. 3. T normal_Indication refers to T1 in FIG. 3.

In all the embodiments above for BFD measurements, UE will indicate to GNB weather is supports BFD relaxation (or UE is stationary UE) in UE capability information message or any other signaling message. If UE supports BFD relaxation (or UE is stationary UE), gNB can configure and/or indicate BFD relaxation to UE. The configuration and/or indication to perform BFD relaxation can be per serving cell or per cell group or per carrier frequency.

Figure 5:
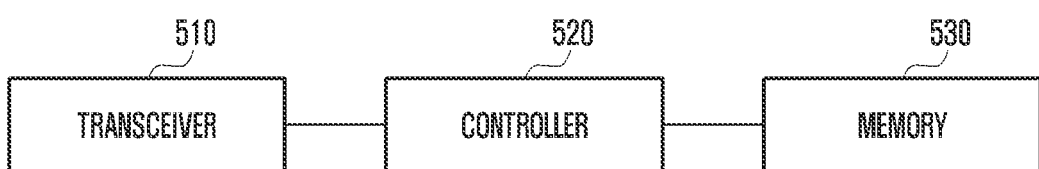
FIG. 5 is a block diagram of a terminal according to an embodiment of the disclosure.

FIG. 5 is a block diagram of a terminal according to an embodiment of the disclosure.

Referring to FIG. 5, a terminal includes a transceiver 510, a controller 520 and a memory 530. The controller 520 may refer to a circuitry, an application-specific integrated circuit (ASIC), or at least one processor. The transceiver 510, the controller 520 and the memory 530 are configured to perform the operations of the terminal illustrated in the FIGS. 1 to 4, or described above. Although the transceiver 510, the controller 520 and the memory 530 are shown as separate entities, they may be realized as a single entity like a single chip. Or, the transceiver 510, the controller 520 and the memory 530 may be electrically connected to or coupled with each other.

The transceiver 510 may transmit and receive signals to and from other network entities, e.g., a base station.

The controller 520 may control the terminal to perform functions/operations according to the embodiments described above. For example, the controller 520 controls the transceiver 510 and/or memory 530 to perform RLM/BFD measurements related procedures according to various embodiments of the disclosure.

In an embodiment, the operations of the terminal may be implemented using the memory 530 storing corresponding program codes. Specifically, the terminal may be equipped with the memory 530 to store program codes implementing desired operations. To perform the desired operations, the controller 520 may read and execute the program codes stored in the memory 530 by using at least one processor or a CPU.

Figure 6:
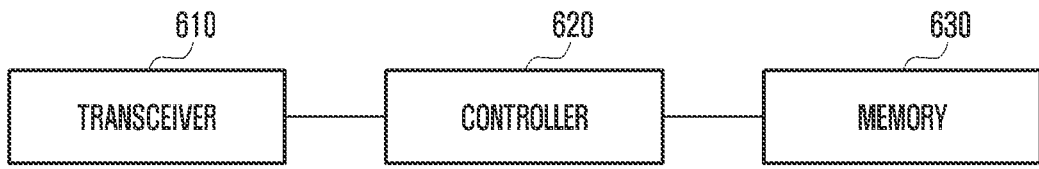
FIG. 6 is a block diagram of a base station according to an embodiment of the disclosure.

FIG. 6 is a block diagram of a base station according to an embodiment of the disclosure.

Referring to FIG. 6, a base station includes a transceiver 610, a controller 620 and a memory 630. The controller 620 may refer to a circuitry, an ASIC, or at least one processor. The transceiver 610, the controller 620 and the memory 630 are configured to perform the operations of the base station illustrated in the FIGS. 1 to 4, or described above. Although the transceiver 610, the controller 620 and the memory 630 are shown as separate entities, they may be realized as a single entity like a single chip. Or, the transceiver 610, the controller 620 and the memory 630 may be electrically connected to or coupled with each other.

The transceiver 610 may transmit and receive signals to and from other network entities, e.g., a terminal or a UE.

The controller 620 may control the base station to perform functions according to the embodiments described above. For example, the controller 620 controls the transceiver 610 and/or memory 630 to perform RLM/BFD measurements related procedures according to various embodiments of the disclosure.

In an embodiment, the operations of the base station may be implemented using the memory 630 storing corresponding program codes. Specifically, the base station may be equipped with the memory 630 to store program codes implementing desired operations. To perform the desired operations, the controller 620 may read and execute the program codes stored in the memory 630 by using at least one processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

As described above, embodiments disclosed in the specification and drawings are merely used to present specific examples to easily explain the contents of the disclosure and to help understanding, but are not intended to limit the scope of the disclosure. Accordingly, the scope of the disclosure should be analyzed to include all changes or modifications derived based on the technical concept of the disclosure in addition to the embodiments disclosed herein.

The invention claimed is:

1. A method performed by a terminal in a wireless communication system, the method comprising:
   receiving, from a base station, a radio resource control (RRC) message including information associated with a relaxation of a radio link monitoring (RLM);
   identifying that the relaxation of the RLM is configured, a timer for detecting a radio link failure (RLF) of a special cell (SpCell) is not running, and a discontinuous reception (DRX) cycle length is not longer than 80 ms;
   based on the information included in the RRC message, identifying whether a radio link quality of an RLM reference signal (RS) resource is better than a threshold; and
   in case that the radio link quality of the RLM RS resource is better than the threshold, performing a measurement over a relaxed evaluation period for the RLM, based on the identification that the relaxation of the RLM is configured, the timer is not running, and the DRX cycle length is not longer than 80 ms.

2. The method of claim 1, further comprising:
   in case that the radio link quality of the RLM RS resource is not better than the threshold, performing a measurement over a normal evaluation period for the RLM, and
   wherein the relaxed evaluation period for the RLM is an integer multiple of the normal evaluation period for the RLM.

3. The method of claim 1, further comprising:
   transmitting, to the base station, a capability message associated with indicating whether the measurement over the relaxed evaluation period for the RLM is supported.

4. The method of claim 1, further comprising:
   in case that the radio link quality of the RLM RS resource is worse than a threshold value, Qout, corresponding to an out-of-sync block error rate, transmitting, to a higher layer, an out-of-sync indication; and
   based on the out-of-sync indication, starting the timer and performing the measurement over the normal evaluation period for the RLM.

5. A method performed by a base station in a wireless communication system, the method comprising:
   transmitting, to a terminal, a radio resource control (RRC) message including information associated with a relaxation of a radio link monitoring (RLM),
   wherein a configuration of relaxation of the RLM, a non running state of a timer for detecting a radio link failure (RLF) of a special cell (SpCell), and a discontinuous reception (DRX) cycle length being not longer than 80 ms are identified,
   wherein, based on the information included in the RRC message, whether a radio link quality of an RLM reference signal (RS) resource is better than a threshold is identified, and
   wherein, in case that the radio link quality of the RLM RS resource is better than the threshold, a measurement is performed over a relaxed evaluation period for the RLM, based on the identification that the relaxation of the RLM is configured, the timer is not running and the DRX cycle length is not longer than 80 ms.

6. The method of claim 5,
wherein, in case that the radio link quality of the RLM RS resource is not better than the threshold a measurement over a normal evaluation period for the RLM is performed, and
wherein the relaxed evaluation period for the RLM is an integer multiple of the normal evaluation period for the RLM.

7. The method of claim 5, further comprising:
receiving, from the terminal, a capability message associated with indicating whether the measurement over the relaxed evaluation period for the RLM is supported.

8. The method of claim 5,
in case that the radio link quality of the RLM RS resource is worse than a threshold value, Qout, corresponding to an out-of-sync block error rate,
the timer is started based on the out-of-sync indication, the out-of-sync indication being transmitted from a lower layer to a higher layer within the terminal, and
wherein, in case that the timer is started, the measurement is performed over the normal evaluation period for the RLM.

9. A terminal in a wireless communication system, the terminal comprising:
a transceiver; and
a controller coupled with the transceiver configured to:
  receive, from a base station, a radio resource control (RRC) message including information associated with a relaxation of a radio link monitoring (RLM),
  identify that the relaxation of the RLM is configured, a timer for detecting a radio link failure (RLF) of a special cell (SpCell) is not running, and a discontinuous reception (DRX) cycle length is not longer than 80 ms,
  based on the information included in the RRC message, identify whether a radio link quality of an RLM reference signal (RS) resource is better than a threshold, and
  in case that the radio link quality of the RLM RS resource is better than the threshold, perform a measurement over a relaxed evaluation period for the RLM, based on the identification that the relaxation of the RLM is configured, the timer is not running, and the DRX cycle length is not longer than 80 ms.

10. The terminal of claim 9, wherein the controller is further configured to:
in case that the radio link quality of the RLM RS resource is not better than the threshold, perform a measurement over a normal evaluation period for the RLM,
wherein the relaxed evaluation period for the RLM is an integer multiple of the normal evaluation period for the RLM.

11. The terminal of claim 9, wherein the controller is further configured to:
transmit, to the base station, a capability message associated with indicating whether the measurement over the relaxed evaluation period for the RLM is supported.

12. The terminal of claim 9, wherein the controller is further configured to:
in case that the radio link quality of the RLM RS resource is worse than a threshold value, Qout, corresponding to an out-of-sync block error rate, transmit, to a higher layer, an out-of-sync indication, and
based on the out-of-sync indication, start the timer, and perform the measurement over the normal evaluation period for the RLM.

13. A base station in a wireless communication system, the base station comprising:
a transceiver; and
a controller coupled with the transceiver configured to:
  transmit, to a terminal, a radio resource control (RRC) message including information associated with a relaxation of a radio link monitoring (RLM),
  wherein a configuration of relaxation of the RLM, a non running state of a timer for detecting a radio link failure (RLF) of a special cell (SpCell), and a discontinuous reception (DRX) cycle length being not longer than 80 ms are identified,
  wherein, based on the information included in the RRC message, whether a radio link quality of an RLM reference signal (RS) resource is better than a threshold is identified, and
  wherein, in case that the radio link quality of the RLM RS resource is better than the threshold, a measurement is performed over a relaxed evaluation period for the RLM, based on the identification that the relaxation of the RLM is configured, the timer is not running and the DRX cycle length is not longer than 80 ms.

14. The base station of claim 13,
wherein, in case that the radio link quality of the RLM RS resource is not better than the threshold, a measurement over a normal evaluation period for the RLM is performed, and
wherein the relaxed evaluation period for the RLM is an integer multiple of the normal evaluation period for the RLM.

15. The base station of claim 13, wherein the controller is further configured to:
receive, from the terminal, a capability message associated with indicating whether the measurement over the relaxed evaluation period for the RLM is supported,
wherein, in case that the radio link quality of the RLM RS resource is worse than a threshold value, Qout, corresponding to an out-of-sync block error rate,
the timer is started based on the out-of-sync indication, the out-of-sync indication being transmitted from a lower layer to a higher layer within the terminal, and
wherein, in case that the timer is started, the measurement is performed over the normal evaluation period for the RLM.

* * * * *